United States Patent
Popescu et al.

(10) Patent No.: US 7,975,039 B2
(45) Date of Patent: Jul. 5, 2011

(54) METHOD AND APPARATUS TO SUPPORT APPLICATION AND NETWORK AWARENESS OF COLLABORATIVE APPLICATIONS USING MULTI-ATTRIBUTE CLUSTERING

(75) Inventors: George V. Popescu, Stamford, CT (US); Zhen Liu, Tarrytown, NY (US); Sambit Sahu, Mahonac, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/535,436

(22) Filed: Aug. 4, 2009

(65) Prior Publication Data
US 2009/0292802 A1 Nov. 26, 2009

Related U.S. Application Data
(62) Division of application No. 10/725,298, filed on Dec. 1, 2003.

(51) Int. Cl.
G06F 15/173 (2006.01)
(52) U.S. Cl. ............... 709/223; 709/200; 717/1
(58) Field of Classification Search .......... 709/223; 717/1
See application file for complete search history.

(56) References Cited

U.S. PATENT DOCUMENTS

| | | | |
|---|---|---|---|
| 5,491,690 A * | 2/1996 | Alfonsi et al. | 370/404 |
| 6,260,036 B1 * | 7/2001 | Almasi et al. | 707/688 |
| 6,922,699 B2 * | 7/2005 | Schuetze et al. | 1/1 |
| 7,260,643 B2 * | 8/2007 | Chi et al. | 709/238 |
| 7,328,033 B2 * | 2/2008 | Rappaport et al. | 455/500 |
| 7,376,752 B1 * | 5/2008 | Chudnovsky et al. | 709/245 |
| 7,664,742 B2 * | 2/2010 | Pettovello | 707/999.003 |
| 7,668,853 B2 * | 2/2010 | Trepess et al. | 707/717 |
| 7,882,248 B2 * | 2/2011 | Sano et al. | 709/228 |
| 2002/0129135 A1 * | 9/2002 | Delany et al. | 709/223 |
| 2003/0120634 A1 * | 6/2003 | Koike et al. | 707/1 |
| 2003/0152034 A1 * | 8/2003 | Zhang et al. | 370/252 |
| 2005/0010571 A1 * | 1/2005 | Solotorevsky et al. | 707/5 |
| 2008/0052628 A1 * | 2/2008 | Bugenhagen et al. | 715/736 |

FOREIGN PATENT DOCUMENTS
WO WO03/043253 * 5/2003
* cited by examiner

Primary Examiner — John Follansbee
Assistant Examiner — Anthony Mejia

(57) ABSTRACT

A method of clustering communication nodes based on network attributes such as network delays and forwarding capacity; on communication interest attributes; and on application attributes such as quality of service preferences/constraints in providing communications between users and application servers. A multi-attribute communication feature vector is formed. That vector is comprised of network attributes, communication interests attributes, and quality of service requirements and is used to form efficient group communication mechanisms for distributed collaborative applications. Then the multi-attribute communication feature vectors are clustered. The clustering methods for multi-type attribute feature vectors are: iterative clustering using a generalized distance space with normalized attribute subspace metrics; fusion clustering, and nested clustering.

18 Claims, 2 Drawing Sheets

METHOD AND APPARATUS TO SUPPORT APPLICATION AND NETWORK AWARENESS OF COLLABORATIVE APPLICATIONS USING MULTI-ATTRIBUTE CLUSTERING

CROSS REFERENCE TO RELATED APPLICATIONS

This application is a divisional application of co-pending U.S. patent application Ser. No. 10/725,298, filed Dec. 1, 2003, which is herein incorporated by reference in its entirety.

BACKGROUND OF THE INVENTION

1. Field of the Invention

Embodiments of the present invention generally relate to group communications. More particularly, embodiments of the present invention relate to communication management based on network attributes and on application attributes.

2. Description of the Related Art

Real-time collaborative applications, such as on-line gaming, enable large numbers of users (participants) to interact to achieve mutually dependent outcomes. Because of their collaborative nature, collaborative applications often have numerous quality of service (QoS) constraints such as end-to-end communication delays, frequency of state updates, quality of data received by the users, which must be met. Meeting such constraints over a distributed communication network requires effective communication management.

As more users participate in a given application the difficulty of implementing effective communication management increases. Eventually it becomes necessary to cluster users according to their communication interest. Clustering reduces wasted bandwidth and aids in constructing distribution trees that satisfy real-time QoS constraints and network node forwarding capacity constraints. While QoS constraints and network constraints can be addressed independently, a more efficient distribution tree can be constructed by addressing QoS constraints and network constraints at the same time.

A communication network can be characterized by a large number of network parameters, such as communication delays between pairs of network nodes, the forwarding capacity of the network nodes, and the packet loss ratios between pairs of network nodes. These network parameters can be mapped into delay maps, capacity maps, and loss maps. For example, network delay maps that map network nodes into multi-dimensional network coordinate spaces which are constructed from selective measurements between pairs of network nodes can be used to improve network communications.

While improving network communications using network maps is beneficial, such network parameters have nothing to do with the communication requirements of a user at the application level. That is, collaborating participants may interact in an application differently, and thus have different communication interests.

A user's communication interest can be modeled as a multi-dimensional interval within an N-dimensional interest space. Each coordinate can represent a topic of interest for one or more participating users, and thus the N-coordinates represent a union of all user communication interests.

Clustering users according to application attributes and clustering of network nodes based on network attributes (round-trip delays, forwarding capacity, etc) are both known. However, such clustering methods may not be optimal in collaborative applications. Therefore, a new method of communication clustering based on both network attributes and on application attributes would be useful.

SUMMARY OF THE INVENTION

In one embodiment, the principles of the present invention generally provide for new methods of network modeling and clustering using both network attributes and application attributes.

Embodiments of the present invention provide for clustering network overlays used by distributed collaborative applications running on the network based on network attributes (network delays, forwarding capacity), communication interest attributes (multidimensional communication interest vectors) to satisfy network constraints (e.g. end-to-end delay constraints, bandwidth constraints) and application constraints (e.g. resolution of transmitted data).

In one embodiment a multi-attribute communication feature vector comprised of network characteristics (such as available bandwidth, client location in the IP address map), communication interests (client request for content updates, client subscription to specific data items or to a set of proximal data sources in network space or application/virtual space) and quality of service requirements (such as delay and loss constraints) is formed. That vector can be used for managing a group communication mechanism.

In another embodiment a network node clustering method based on a weighted distance function using normalized attribute subspace metrics is used. In another embodiment, a fusion-based network node clustering method in which network nodes are clustered in each attribute space followed by a combination of subspace classifiers. Another embodiment incorporates a nested network node clustering method in which network nodes are initially clustered based on a sub-set of attributes and then re-clustered by iteratively considering additional attributes.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, wherever possible, to designate identical elements that are common to the figures.

DETAILED DESCRIPTION OF THE PREFERRED EMBODIMENT

The present invention models a communication network using multi-attribute feature vectors, one for each node of an overlay network. Each vector represents its node as a point in a multi-type attribute space that spans network and system attributes and communication interest attributes. The nodes are then clustered into sets based on their multi-attribute feature vectors.

Network and system attributes include network delay attributes that are represented as either network delay position attributes (nodes positioned in an N-dimensional network delay space) or as relative network delay attributes indexed in a network distance map containing the delay distances obtained from round trip time (RTT) measurements between selected pairs of overlay nodes. Network and system attributes also include: network bandwidth attributes that represent the available network bandwidth between pairs of overlay nodes that are indexed in a network capacity map, network loss attributes that represent the packet loss rate between pairs of overlay network nodes that are indexed in a network loss map; and node fanout attributes that represents the available node forwarding capacity that are indexed in a forwarding capacity map.

Communication interest attributes include: communication interest items that represents the set of communication interest items of a user (participant/client); communication interest domains that represent a Cartesian product of communication interest intervals that represent client communication interest; and a combination of interest items and interest domains which represent each client's interest as a union of interest items and/or multi-dimensional interest domains.

The multi-attribute feature vectors further include the application's QoS requirements/preferences which act as constraints on sets of overlay nodes or groups of clients. Those QoS constraints include network QoS constraints such as model end-to-end delay requirements, bandwidth requirements, reliability requirements, and application-level quality constraints such as model application specific data transmission requirements Each attribute space uses a distinct metric. In the network delay space each point represents "virtual" coordinates of the nodes in the network overlay. The Euclidean distance in the virtual network delay space approximates the relative network delay between the overlay nodes measured on the shortest network path.

Figure 1:
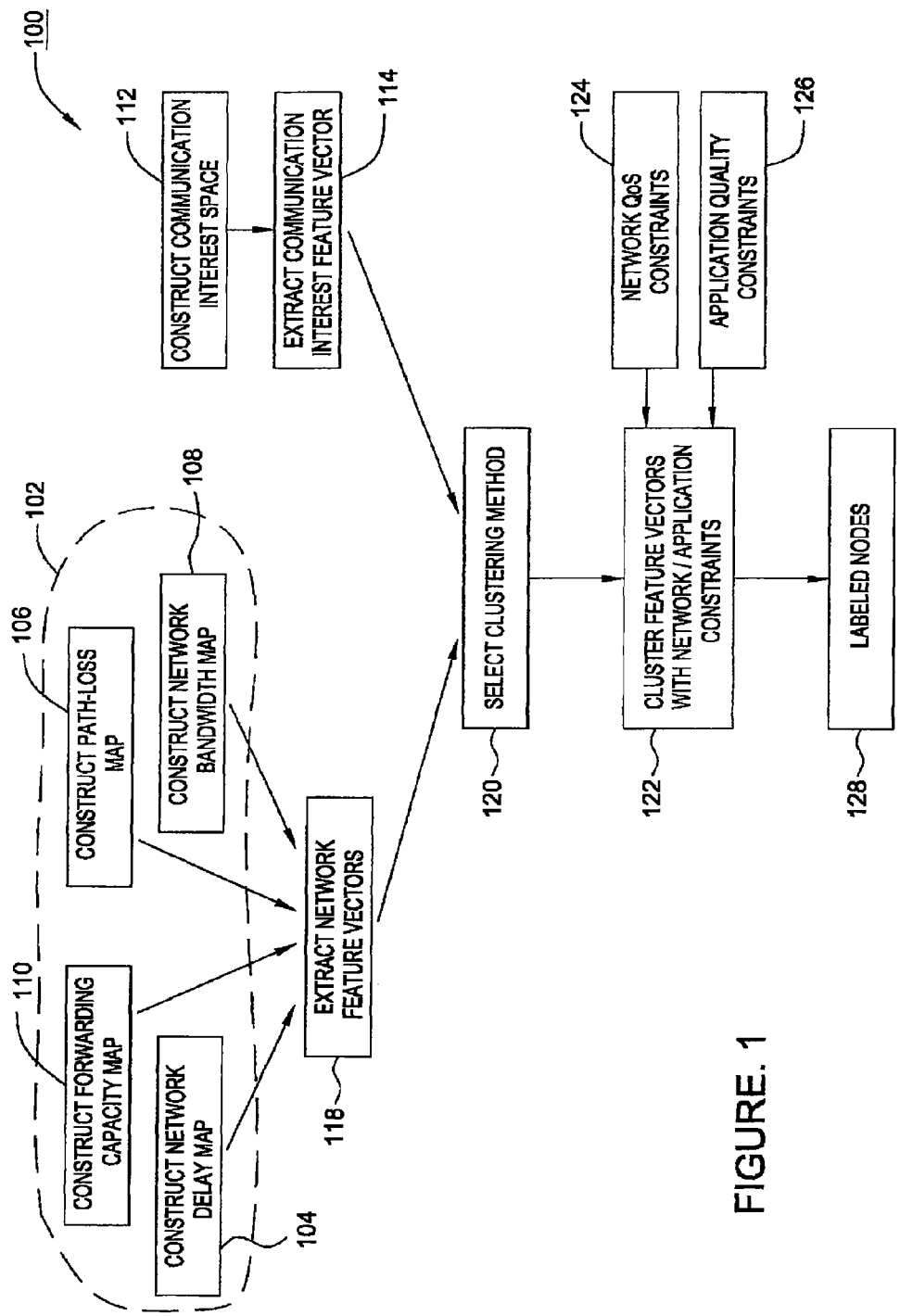
FIG. 1 is a flow diagram that illustrates the construction of a multi-type attribute space and its clustering.

FIG. 1 is a flow diagram 100 that illustrates the construction of a multi-type attribute space and clustering based on network and application constraints. Step 102 comprises constructing network attribute maps. Those maps include delay maps 104 that are constructed using measured network delays, a path loss map 106 based on path losses, a bandwidth map based on the bandwidths at the nodes, and a forwarding capacity map 110 based on the forwarding capacity at the nodes. Additionally, at step 112 a communication interest space map is formed. Then, at step 114 feature vectors are extraction from the communication map formed in step 112. Then, at step 118 network feature vectors 118 are extracted from the network attribute maps constructed in step 102.

At step 120 a clustering method is selected based on the available set of features (subsets of features are used by the clustering methods) and the classification objective. At step 122 clustering is performed on the feature vectors. That clustering is based on network QoS constraints obtained at a step 124 and application quality constraints obtained at a step 126. The result is a step 128 of forming a list of labeled nodes 128 based on network and application constraints. The construction of the multi-type attribute feature space, including the selection of feature vectors and of distance function, is presented subsequently, as is the clustering algorithms.

Step 112, the construction of a communication interest space, is based on distance measurements of the similarity between communication interest vectors or between groups of nodes with common interest. Communication interest can be modeled as a point (e.g. a subscription described by a descriptor set), a cell (e.g. an area of interest expressed as an interval on a virtual application map), or a reunion of points and cells.

To measure the similarity between client's interest non-linear distance functions may be used. When the communication interest feature vector is a union of several domains scattered in the communication interest space, non-linear distance functions—such as the measure of overlap between multiple cells—are used to measure similarity. Alternatively, the communication interest space can be mapped into a partition domain representation, where the space is partitioned in a set of domains and nodes are indexed based on the overlapping between their communication interest and the interest domains. In this representation a membership list—the set of nodes with non-null overlapping of communication interest with the interest domain—is defined for each domain. A distance function for this mapping measure the commonality between membership lists associated with the interest domains.

More specifically, the communication interest can be modeled as follows:

1. a vector:

$$\vec{i} = [i_0, \ldots i_n] \quad (2.1);$$

2. a communication interest cell:

$$c = [\vec{i}_1, \vec{i}_2], \quad (2.2)$$

where $[\vec{i}_1, \vec{i}_2] = [i_{11}, i_{12}] \times [i_{21}, i_{22}] \times \ldots [i_{n1}, i_{n2}]$ is a notation for the Cartesian product;

3. multiple cells representing the communication interest of a single node:

$$mc = \bigcup_k [\vec{i}_1^k, \vec{i}_2^k]. \quad (2.3)$$

Several distance functions can be defined for the communication interest space:

1. Non-linear distance between the interest points:

$$d(\vec{i}_1, \vec{i}_2) = \sum_{k=0}^{n-1} \delta(i_{1,k} - i_{2,k}) \quad (2.4)$$

where $\delta$ is the Kronecker delta function.

2. A non-linear distance function that uses Euclidian distance between the centers of the communication interest domains:

$$d(c_k, c_p) = \begin{cases} 0, & \text{if } \left\| (\vec{i}_1^k, \vec{i}_2^k)/2, (\vec{i}_1^p + \vec{i}_2^p)/2 \right\| < \\ \left\| (\vec{i}_1^k, \vec{i}_2^k)/2 \right\| \text{ or } \left\| (\vec{i}_1^p + \vec{i}_2^p)/2 \right\| \\ \left\| \min(\vec{i}_{21}^p, \vec{i}_{21}^k) - \max(\vec{i}_{11}^p + \vec{i}_{11}^k) \right\| * \ldots * \\ \left\| \min(\vec{i}_{2n}^p, \vec{i}_{2n}^k) - \max(\vec{i}_{1n}^p + \vec{i}_{1n}^k) \right\| \end{cases} \quad (2.5)$$

3. The degree of overlapping of multiple cells:

$$o(c_k, c_p) = \begin{cases} 1, & \text{if} \left\|(\vec{i}_1^k, \vec{i}_2^k)/2, (\vec{i}_1^p + \vec{i}_2^p)/2\right\| < \left\|(\vec{i}_1^k, \vec{i}_2^k)/2\right\| \text{ or } \left\|(\vec{i}_1^p + \vec{i}_2^p)/2\right\| \\ 0, & ow \end{cases}$$

$$d(mc_x, mc_y) = \sum_{p}^{card(mc_x)} \sum_{k}^{card(mc_y)} o(c_k, c_p)$$

Using these definitions, the distance between a node's cell communication interest and a cluster can be computed as the average overlap between node's communication interest and the reunion of the interest domains of the nodes in the cluster. The distance between two clusters is the average overlap between the reunions of the set of cells representing the communication interest of each cluster.

An alternative definition of the distance which is based on wasted communication bandwidth uses the matrix of communication interest:

$$r(i, j) = \begin{cases} 0, & \text{when } n_i \text{ not interested in } n_j \\ 1, & ow; \end{cases} \quad (2.7)$$

With this definition, the communication waste within a cluster of nodes, is computed as:

$$Wd = \sum_{ni, nj \in C_L, ni \neq nj} 1 - r(i, j), \quad (2.8)$$

where ni, nj are nodes in the cluster $C_L$.

The definition can be extended for partition domain clustering (instead of node clustering). The matrix entry r(i,j) represents in this case the interest of node $n_i$ in the subject $t_j$. The partition domain membership is composed of all nodes with an interest in $t_j$:

$$m(c_i) = \{\forall N_j, mc(N_j) \cap c_i \neq \text{null}\} \quad (2.9).$$

The waste distance between two partition domains is:

$$Wd(c_i, c_j) = \sum_{m=0}^{card(c_i)} \sum_{n=0}^{card(c_j)} (1 - \delta(m - n)), N_m \in c_i, N_n \in c_j, \quad (2.10)$$

where δ(i) is the discrete (Kronecker) delta Dirac function.

The distance to a cluster of partition domains $C_L$ is:

$$Wd(c_i, C_L) = \sum_{j=0}^{card(C_L)} Wd(c_i, c_j), \text{ where } c_j \in C_L \quad (2.11)$$

wherein δ(i) is the discrete delta Dirac function.

Step 102, the construction of network attribute maps, is performed generally as follows. In the network attribute space, Euclidean distance is used for the network delay between two nodes that are mapped on a network N-dimensional position map:

$$d(\vec{n}_1, \vec{n}_2) = \left[\sum_{k=0}^{p} (x_{n1}^k - x_{n2}^k)^2\right]^{1/2}, \quad (2.12)$$

where $\vec{n}_i$ is the N-dimensional position vector representing the overlay node $N_i$ in the network delay Euclidean space. When network map containing the distances between all pairs of nodes in the overlay is available, the $d(N_1, N_2)$ is defined as the shortest path distance on the overlay between the two nodes.

The distance from a node to a cluster of nodes is defined as the average distance to the nodes within the cluster. When nodes are represented by their network position vector this corresponds to the distance between the node and the center of the cluster; when network maps containing the delays between pairs of nodes are used, this distance is computed by simply averaging the delays to the nodes in the cluster.

Another distance measure that is used is the network path distance on a tree constructed using the nodes in the cluster. This distance function embeds constraints on how nodes in the cluster are organized (using a tree structure in this case). The distance to the cluster of nodes is evaluated on the topology constructed with the nodes in the cluster.

The delay distance to a tree structure within the cluster—is computed as:

$$d(n_k, T_c) = \left(\sum_{i=0}^{card(tr(k))-2} d(n_i, n_{i+1})\right), \text{ where} \quad (2.13)$$

$Tr(k) = [n_0, \ldots n_{card(Tr(k))-1}]$, where $n_{card(Tr(k))-1} = n_k$ shortest path traversal of $T_C$ tree from root to node $n_k$.

Another metric for evaluating the clustering of nodes with topology constraints is the maximum delay on the tree constructed with the nodes of the cluster.

$$m\_delay(c) = \max_k \left(\sum_{i=0}^{card(Tr(k))-2} d(n_i^k, n_{i+1}^k)\right), \quad (2.14)$$

$Tr(k) = [n_0^k, \ldots n_{card(Tr(k))-1}^k]$ path of $k - th$ traversal of $T_C$ tree This metric can be used as a measure a quality of the clustering solution; it can be employed as stop criteria in the clustering algorithms.

An alternative definition for network (delay) distance between a node and a cluster of nodes uses the minimum distance between the node and the parent node on the tree constructed with the nodes in the cluster:

$$d(v, C) = \min(\|v - c\|), \forall c \in T_C, f(c) - 1 < \max\_fout(c),$$
$$\max\_fout(c) - \text{maximum fanout of}$$
$$\text{node } c; T_C = \text{Tree (cluster C nodes)} \quad (2.15)$$

A loss rate distance between the root node of a tree and a tree node on the network overlay can be computed with:

$$d(\text{root}, n(k)) = \left(1 - \prod_{n \in Tr(k)} (1 - pb_n)\right), \quad (2.16)$$

where Tr(k) is the overlay path from root to the node n(k).

Construction of a unified communication feature space based on the application space, the network space and on user requirement attribute space uses a non-linear mapping of the metrics in each space. The mapping parameters are chosen according to a heuristic that consider the trade off between network space optimized or application (interest) optimized communication primitives. The stopping criteria for the clustering algorithms are derived from network and application quality of service requirements and/or preferences.

Step 120, selecting a clustering method, is not necessarily a simple task. Clustering heterogeneous data from a multi-type attribute space constructed with application interest attributes and network maps requires new clustering methods that take into account specific criteria derived from the application constraints. There are three general types of clustering proposed here. The first is multi-type attribute clustering using a generalized distance function. In that method the multi-type attribute feature space and the non-linear mapping of distance vectors are constructed. Then a new distance function—e.g. a weighted sum of normalized distances in each attribute feature space is defined. Then a clustering is performed using an algorithm that assigns nodes to the closest cluster using the average distance to the cluster nodes. Examples of this technique are presented subsequently.

In a nested multi-type attribute clustering the nodes are clustered using one set of attributes—e.g. communication interest—followed by an iteration of a succession of cluster modifications obtained by considering the metrics in each of the attribute spaces. An example of the nested method is presented subsequently.

The last general method is the fusion-based multi-type attribute clustering method that comprising clustering nodes independently in each space (e.g. cluster only based on node communication interest, cluster nodes in the network delay space), followed by creating multi-type attribute clusters by classifying the nodes based on the output of each attribute space classifier output. This approach uses the attribute-space distances as defined above; however instead of defining a generalized distance function as a combination of distances for each attribute space, the fusion-based method performs classification in each attribute space independently and then uses the outputs to feed a classifier that performs the final clustering. An example of a fusion classifier is presented subsequently.

One multi-type attribute clustering technique uses normalized sub-space distance metrics. As an example of multi-type attribute clustering using generalized distance functions, described below are algorithms for clustering receivers using communication interest and network QoS constraints. The set of nodes to be clustered (which may be part of a network overlay) have network attributes (network maps) and communication interest attributes. The network attribute vector consists of node fanout (the number of children that can be supported per node) and network delay space positions (the set of coordinates that describe the relative position of the overlay nodes in a N-dimensional space constructed based on relative measurements between overlay nodes). The network position attributes are used to approximate the distance between any two nodes in the overlay within an error bound that depends on the dimensionality of the space.

Alternatively, the network attributes can be the direct distance (shortest distance computed on the network overlay path) between a node and any other node in the overlay. Relative positioning of overlay nodes using direct measurements requires the definition of an equivalent distance function that preserves the convergence of the average distance-based clustering algorithm.

The first step of this multi-type attribute clustering method is defining a generalized distance function. As discussed above, distance functions can be defined for each method of representing network delay parameters. The distance between a node and a cluster in the network attribute space can be computed as:

A. Distance between a node and the center of each cluster, whose coordinates are computed by averaging the coordinates of the nodes in the cluster. B. The mean direct (shortest path) distance between a node and the set of nodes in the cluster:

(1.1)

$$D(n, C_L) = \sum_{k \in C_L} \|\vec{n} - \vec{n}_k\|; \quad (3.1)$$

The algorithm proceeds by iterating through the set of nodes and assigning the node to the closest cluster (according to the distance computing using A. or B) until the stopping criteria is met. The cluster mean (for A) or membership (for B) is updated after each node classification.

The first case corresponds to k-Means clustering, where the feature space is the network delay space. The clustering algorithm for the second case selects the cluster $C_L$ which corresponds to the $$\min_L D(n, C_L). \quad (3.2)$$

It can be shown that for this distance function definition the iterative clustering algorithm also converges to the average distance between nodes and the corresponding clusters:

$$\min \frac{1}{N} \sum_{k=0}^{N-1} D(n_k, C_L) \text{ where } n_k \in C_L. \quad (3.3)$$

Therefore this algorithm also minimizes the average distance between the nodes within the cluster.

Two approaches are proposed for modeling the communication interest:
I. Clustering client's communication interest: nodes can have multiple labels depending on the span of their communication interest.
II. Clustering communication interest domains—consist in partitioning of the interest space followed by the clustering of partitions based on the similarity of their node membership list.

In I., the distance for clustering node's communication interest is defined as:
A. Overlap communication interest distance as defined in (2.6).
B. Distance measure (communication waste) based on the node binary preference function:

$$r(n_i, n_j) = \begin{cases} 0, & \text{when } n_i \text{ not interested in } n_j \\ 1, & \text{otherwise.} \end{cases} \quad (3.4)$$

The waste measure between node n and cluster $C_L$ is then:

$$w(n, C_L) = \sum_{n_i \in C_L} (1 - r(n, n_i)); \quad (3.5)$$

The preference-based grouping algorithm assigns a node to the cluster $C_L$ corresponding to the $$\min_L(w(n, C_L)), \quad (3.6)$$

updating the cluster membership after each iteration; it can be shown that the iterative algorithm converges to a solution that minimizes the overall waste:

$$\min \sum_{k=0}^{N-1} w(n_k, C_L) \text{ where } n_k \in C_L. \quad (3.7)$$

In II, the membership list of a partition is defined as in the first section (2.9).

Two types of distances are defined between a partition domain and a cluster of partition domains:

A) network attribute space distance is the sum of all members of the partition to the nodes in the cluster:

$$Dn(c_i, C_L) = \frac{1}{\text{card}(c_i) * \text{card}(C_L)} \sum_{n_j \in c_i} \sum_{k \in C_L} \|\vec{n}_j - \vec{n}_k\| \quad (3.8)$$

this corresponds to the distance between the position center of the partition domain and the center of the cluster; when grouping based on the network attribute space distance only, the k-Means algorithm will minimize the average distance (computed over all clusters) between cluster partition domains; the corresponding definition for the distance between two partitions is $$Dn(c_i, c_m) = \frac{1}{\text{card}(c_m) * \text{card}(c_i)} \sum_{n_j \in c_i} \sum_{k \in c_m} \|\vec{n}_j - \vec{n}_k\| \quad (3.8a)$$

B) communication interest distance between a partition domain and a cluster of partition domains: Di(ci, $C_L$) using (2.11)—when grouping based on the communication interest only, the partitions are added to the cluster which correspond to the minimum increase of communication waste function.

Additionally, a fanout function is defined as the average fanout of partition domain member nodes as:

$$F(c_i) = \frac{1}{\text{card}(ci)} \sum_{nj \in ci} (f(nj)). \quad (3.9)$$

The distance between a partition domain and a cluster of partition domains is then:

$$Df(c_i, C_L) = \exp(-|F(c_i) - F(C_L)|) \quad (3.10).$$

This measure is promoting the addition of partitions with high fanout per node to clusters with fanout deficit per node.

The multi-type attribute clustering approach uses, in addition to the network attributes and communication interest attributes, the node fanout $f(n_k)$ attribute to define a generalized distance function as follows:

$$MD(ci, C_L) = w1*Df(ci, C_L) + w2*Di(n, C_L) + w3*Dn(n, C_L) \quad (3.11);$$

the k-Means using this generalized distance function will converge to a target solution that minimizes a linear combination of the distance between cluster nodes, the communication waste and the average difference between per/cluster fanout.

Another example of clustering of multi-type attribute feature vectors is using minimization of a generalized objective function that includes waste and delay penalties. The waste function is computed assuming that all nodes transmit at the same rate:

a.

$$W = \sum_{k=1}^{K} \sum_{x=1}^{\text{card}(C(k))} \sum_{y, y \neq x}^{\text{card}(C(k))} Wd(cy, cx), \quad (3.12)$$

card(C(k)) is the cardinality of cluster C(k), where Wd(cy, cx) is the waste when grouping the partition domain $c_y$ and $c_x$ as defined in the previous section (2.10).

b.

$$W(x, Ck) = \sum_{k=1}^{K} \sum_{x=1}^{\text{mcard}(Ck)} \text{card}(Ck) - \quad (3.13)$$

card(mc(x))mcard(Ck) number of multiple cells in cluster CK

The delay penalty considers the delay in each source tree constructed within the group is:

$$Dp(x, Ck) = \sum_{k=1}^{K} \sum_{x=1}^{\text{card}(C(k))} (D(x, Tc) - \Delta_{treshold}) \quad (3.14)$$

The maximum delay distance on the tree where the delay on a path from the root of the tree is defined as in 2.13.

After the foregoing an energy function is defined as:

$$E(x, Ck) = w1*W(x, Ck) + w2*Dp(x, Ck) \quad (3.15).$$

The base line algorithm is:

1. Use k-Means to group based on interest only
2. Start with the grouping at step 1.
3. While($|\Delta E|$ > Threshold)

-continued

```
{ ΔE=0;
    For (i=1; i<N; i++){
        For(j=1; j<K; j++)
            if (E(n(i), C(j)) < E(n(i), e_oldn(j) ) ))
                assign n(i) to C(j)
            ΔE += E(n(i), C(j)) − E(n(i), e_old(n(j) )
    }
}
```

As noted, node clustering can be performed using a nested multi-type attribute clustering approach. An example of such an approach is iterative split and merge clustering in which multiple clustering criteria are used on an attribute spaces in succession. A cluster is composed of the nodes that belong to the union of membership sets of all partition domains in the cluster. Start by defining the distance function between clusters CL(1) and CL(2):

$$D(CL(1), CL(2)) = w1 * \frac{1}{card(CL(1)) * card(CL(2))} \sum_{i=0}^{card(CL(1))} \sum_{j=0}^{card(CL(2))} \|\vec{n}_i - \vec{n}_j\| + w2 * \frac{1}{card(CL(1)) * card(CL(2))} * \sum_{i=0}^{card(CL(1))} \sum_{j=0}^{card(CL(2))} [1 - r(i, j)] \quad (3.16)$$

A first method uses a cluster splitting conditioned on the communication interest of the nodes and a merging condition on the network attribute space. This model considers that the normalized interest attribute space is partitioned in a uniform grid of $M^n$ (1/M—resolution of partitioning, n—cardinality of the attribute space) and cluster the nodes in L clusters by;
Partitioning the interest attribute space to create an n-dim grid and then computing the density of nodes interested in each partition; and
cluster the partitions according to density of the nodes using a mode detection method.
An example:

One a cluster is formed it can be split using a cluster splitting algorithm to split the cluster into two clusters:
Split(CL(0))
1. Start with two partition domains that are further apart when using distance function: $d(c_i,c_j)=w1*Dn(c_i, c_j)+w2*Wd(c_i,c_j))$ (3.16a)–max, where $c_i,c_j \epsilon C_L(0)$, using distances (3.8a and 2.10)
2. Iterates through the list of nodes of the cluster to be split, adding them to the closest cluster using the distance between the node and the cluster:
$D(c, CL(i))=w1*Dn(c, CL(i))+w2*Wd(c, CL(i))$, i=1, 2, using distances (3.8, and 2.11)

The split algorithm output two clusters CL(1) and CL(2), with the partition domains of the initial cluster split between the new clusters.

In addition to splitting, clusters can be merged:
Merge (CL(1), CL(2)):
The merging of clusters labels the nodes in the second cluster with the first cluster label:

for (k=0; k<card(CL(2)); k++) $e(n_k)=e(CL(1))$ where $n_k \epsilon CL(2)$;

Stop condition combines:
a condition on a threshold on the reduction in the total grouping waste (3.12);
a condition in the modification of cluster membership between successive iterations, where the membership is defined as:

$$\sum_{i=0}^{N} 1 - \delta(e(n_i) - e\_old(n_i)),$$

where $e(n_i)$ is the label of node ni.
The iterations are stopped when there is no reduction in total grouping waste of when the cluster membership does not change between successive iterations.
A second method of using the split-merge algorithm splits the clusters into p sub-clusters based on network distance

```
while (stop_condition){
Find the cluster that has maximum average waste and split it into two clusters;
max_waste=0;
for (k=0; k<L; k++)
    {
```

$$W(k) = \frac{2}{card(C_L(k)) * (card(C_L(k)) - 1)} \sum_{i=0,j=0,i<j}^{card(C_L(k))} (1 - r(i, j));$$

```
        if(W(k)>max_waste)
            {k_max=k; max_waste = W(k);}
    }
Split (CL(k_max));
Find the closest clusters when using the weighted distance function defined in (3.16)
min_dist=max_val;
    for (c1=0; c1< L+1; c1++)
        for (c2 =0; c2<L+1 ; c2++)
            {
            if (min_dist>D(CL(c1),CL(c2)))
            { min_dist= D(CL(c1),CL(c2)), c1_min=c1; c2_min=c2;}
            }
            merge (CL(c1_min), CL(c2_min));
}
``` constraints (diameter of the cluster in the network attribute space), followed by merging the clusters with high overlap (to obtain maximum reduction of waste). The model considers that the normalized interest attribute space is partitioned in a uniform grid of $M^n$ (1/M—resolution of partitioning, n—cardinality of the attribute space). The nodes are assigned to L clusters such that the average distance between nodes in a cluster and the communication waste are minimized. The algorithm proceeds as the one above except that the splitting condition is on the distance waste and merging is on the overlap between clusters. A cluster is split in p sub-clusters while the merging reduces in the same step the number of clusters to L by merging p-1 clusters.

The splitting section of the second method split the cluster with the maximum network distance between nodes into p sub-clusters such that the overlap between sub-clusters is minimized. That splitting method is:

Select p partition domains which are the most distant—using the weighted distance function in (3.16a))—by calculating the distances between partitions sorting the distances and selecting a partition corresponding to the maximum distance between a partition domain in the list and the remaining partition domains; use the p partition domains as starting points for p sub-clusters;

2. iterate through the list of partition domains in the cluster; adding them to the sub-cluster corresponding to the maximum overlap.

The merging section of the second method is as follows:

```
for(i=0;i<p-1; i++)
{
for (c1 =0 ; c1<L ; c1++)
    for (c2=c1 +1 ; c2 < L ; c2++ )
        Merge (CL(c1), CL(c2)) when the highest overlap ratio:
```

$$\max_{c1,c2}\bigl(\min\bigl(o(c1,c2)/A(c1),\,o(c1,c2)/A(c2)\bigr)\bigr) \quad (3.17)$$

where the A(ck) is the volume of a partition domain.
}

The clusters are merged in the order of their overlap (function for the overlap between two cluster) until the number of clusters is L. The stop criterion is a threshold on the reduction in the total grouping waste and a threshold on the change in cluster membership.

The third approach to clustering is the fusion-based multi-type attribute clustering method that comprising clustering nodes independently in each space (e.g. cluster only based on node communication interest, cluster nodes in the network delay space), followed by creating multi-type attribute clusters by classifying the nodes based on the output of each attribute space classifier output. An example of this approach is the fusion clustering of grouping servers and receiver overlay nodes. The receivers have a communication interest and network position vector defined as network position vector, communication interest vector; the servers are described by their forwarding capacity, and the network position vector.

The clustering in network delay space involves two steps. The first step is clustering of nodes according to prefix match/network delay map information and refinement of the clustering according to group size and delay constraints. Each network bin corresponds to a range of IP addresses. The classifier maintains a table with an entry for each of the prefix-based clusters. The first step of clustering uses the longest prefix matching of IP address to assign the node to a network bin. Then, the second step clusters the receivers according to constraints of group size (which are imposed by fanout limitations of the nodes in the cluster) and delay constraints. After assignment to a prefix bin the nodes are further clustered within the bin by selecting a set of cluster leaders and partitioning the network delay space using Delaunay triangulation.

In the communication interest space, nodes are clustered using the overlap distance function (waste distance function only—(3.5)) using k-Means, using the method described in section 3.1.

The fusion classifier labels the nodes using a non-linear combination of the output of the network distance classifier and communication interest classifier such that cardinality constraints are satisfied (the number of nodes in the cluster is bounded).

The steps of the clustering method are as follows:
1. Construct sub-clusters by intersecting the network distance clusters with communication interest clusters; each resulting sub-cluster contains only nodes with the same network bin label and communication interest label;
2. Computer the distances between the network positions of the centers of sub-clusters and the distance between the communication interests of sub-clusters;
3. Merge the sub-clusters until the number of remaining clusters is L (the constraint on the number of clusters) by:
   sorting the distances (weighted function of network and communication interest distance) between the sub-clusters; and
   form hierarchical aggregation of pairs of sub-clusters by merging the sub-clusters corresponding to the smallest aggregate distance for which the cluster cardinality condition is satisfied.

The final clusters will contain nodes that are close in network distance and have similar communication interest. The clusters can be mapped to a set of L cluster leaders (servers), such that the constraint on the forwarding capacity of the servers is satisfied, and the number of communication groups supported per cluster leader and the average network distance between the nodes in the cluster is jointly minimized.

While clustering in the network space domain or based on receiver communication interest are individually useful, using both—network and receiver communication interest information—allows optimization of the communication infrastructure according to network QoS and application constraints. This enables a communication performance gain. Optimizing the communication infrastructure according to both network and communication interest parameters enables efficient grouping by QoS constraints. Since the network parameters are taken into account prior to mapping the communication interest groups into multicast groups, multi-attribute clustering leads to better usage of available forwarding capacity for several multicast communication trees can be constructed for each multicast group. Additionally, the communication efficiency can be traded for the quality of group communication by adequate selection of clustering method parameters.

The trade-off for better performance is the complexity of indexing and managing monitored network data and receiver interest. A straightforward approach for small overlays is the centralized management of network and client communication interest. Large network overlays may use a distributed management of network overlay, delegating the communication interest clustering to several control nodes that manage partitions of the overlay.

Multi-type attribute clustering has application in various group communication and data distribution areas. In collaborative interactive applications, the participants are grouped dynamically based on their communication interest while the underlying network overlay minimizes the delay between participants in the same group. Session management for distributed interactive applications requires optimal grouping of receivers to minimize the communication waste, especially when the data rate is high, while also imposing constraints on the end-to-end delay. Such problem can be modeled as a multi-type attribute clustering with constraints formulated in the network delay domain.

Multi-type attribute clustering also provides the mechanisms that support network virtualization: assignments of node identifiers based on application-level semantics and network position parameters. The virtualized ID allocated to network overlay node uses node position coordinates in the virtual network delay space and the mapped parameter representing node communication interest. Distributed look-up applications use such mappings to increase the efficiency (e.g. by directing the search to selected nodes based on their identifier instead of flooding the search query to all nodes in the overlay) of the distributed search by reducing the communication bandwidth per each search operation and increasing the response time of the distributed search (e.g. reducing the average hop count of search query routing).

Multi-type attribute clustering can be used to support location-based services in mobile applications. The participating nodes have a network position obtained by referencing to a local or global positioning system. In addition, selected nodes provide services (such as streaming data services), which can be accessed by mobile receiver nodes based on their interest and proximity to the nodes providing the service. Receiver nodes are clustered according to their communication interests (data requests), network proximity to server nodes, and capacity limitations of the node providing the service.

Figure 2:
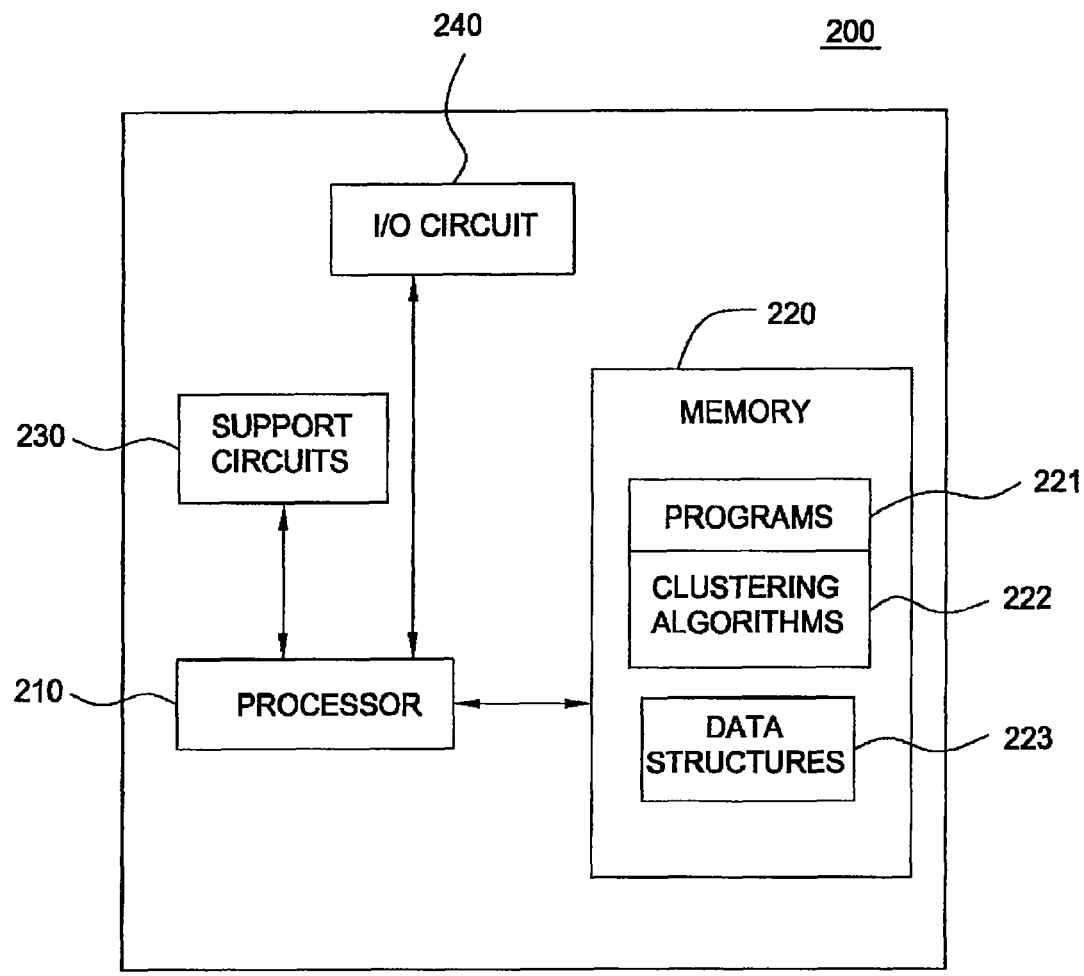
FIG. 2 is a high level block diagram of a computer for performing the tasks shown in FIG. 1.

FIG. 2 is a high level block diagram of a computer 200 for performing the tasks shown in FIG. 1. The computer 200 comprises a processor 210 as well as a memory 220 for storing control programs 221, including clustering algorithms 222, and data structures 223 and the like. The processor 210 cooperates with conventional support circuitry 230 such as power supplies, clock circuits, cache memory and the like as well as circuits that assist in executing the software routines stored in the memory 220. As such, it is contemplated that some of the process steps discussed herein as software processes may be implemented within hardware, for example, as circuitry that cooperates with the processor 210 to perform various steps, or stored on a computer readable medium. The computer also includes input-output circuitry 240 that forms an interface between the various functional elements communicating with the computer 200.

Although the computer 200 is depicted as a general purpose computer that is programmed to perform various control functions in accordance with the present invention, the invention can be implemented in hardware, for example, as an application specified integrated circuit (ASIC). As such, the process steps described herein are intended to be broadly interpreted as being equivalently performed by software, hardware, or a combination thereof.

While the foregoing is directed to embodiments of the present invention, other and further embodiments of the invention may be devised without departing from the basic scope thereof, and the scope thereof is determined by the claims that follow.

The invention claimed is:

1. A computer readable storage device containing a program that, when executed by a processor, causes the processor to perform a method for clustering a plurality of network nodes in a multi-type vector space, where the method comprises:

forming a plurality of network attribute maps based on one or more network constraints;

forming a communication interest space map based on one or more application constraints, wherein the forming the communication interest space map is based on a distance measurement of a similarity between at least two of one or more communication interest feature vectors, and wherein the similarity is measured using a non-linear distance function;

extracting the one or more communication interest feature vectors from the communication interest space map;

extracting one or more network attribute feature vectors from the plurality of network attribute maps;

obtaining one or more network quality of service constraints;

forming a single feature vector for each of the plurality of network nodes, the single feature vector being based on the one or more communication interest feature vectors, the one or more network attribute feature vectors, and the one or more network quality of service constraints; and forming a list in which one or more of the plurality of network nodes are labeled based on the single feature vector for each of the plurality of network nodes.

2. The computer readable storage device of claim 1, wherein forming network attribute maps includes steps of:

forming a plurality of delay maps from one or more measured network delays;

forming a path loss map based on one or more network path losses;

forming a bandwidth map based on one or more bandwidths of the plurality of network nodes; and forming a forwarding capacity map based on one or more forwarding capacities at the plurality of network nodes.

3. Apparatus for clustering a plurality of network nodes in a multi-type vector space, comprising:

means for forming a plurality of network attribute maps based on one or more network constraints;

means for forming a communication interest space map based on one or more application constraints;

means for extracting one or more communication interest feature vectors from the communication interest space map, wherein the forming the communication interest space map is based on a distance measurement of a similarity between at least two of one or more communication interest feature vectors, and wherein the similarity is measured using a non-linear distance function;

means for extracting the one or more network attribute feature vectors from the plurality of network attribute maps;

means for obtaining one or more network quality of service constraints;

means for forming a single feature vector for each of the plurality of network nodes, the single feature vector being based on the one or more communication interest feature vectors, the one or more network attribute feature vectors, and the one or more network quality of service constraints; and means for forming a list in which one or more of the plurality of network nodes are labeled based on the single feature vector for each of the plurality of network nodes.

4. A method of clustering a plurality of network nodes comprising:
 using a processor to perform steps comprising:
  forming a plurality of network attribute maps based on one or more network constraints;
  forming a communication interest space map based on one or more application constraints, wherein the forming the communication interest space map is based on a distance measurement of a similarity between at least two of one or more communication interest feature vectors, and wherein the similarity is measured using a non-linear distance function;
  extracting the one or more communication interest feature vectors from the communication interest space map;
  extracting one or more network attribute feature vectors from the plurality of network attribute maps;
  obtaining one or more network quality of service constraints;
  forming a single feature vector for each of the plurality of network nodes, the single feature vector being based on the one or more communication interest feature vectors, the one or more network attribute feature vectors, and the one or more network quality of service constraints; and
  forming a list in which one or more of the plurality of network nodes are labeled based on the single feature vector for each of the plurality of network nodes.

5. The method of claim 4, wherein the forming the communication interest space map is based on a distance measurement of a similarity between at least two of the plurality of network nodes that share a common interest.

6. The method of claim 4, wherein the one or more network constraints comprise at least one of: available bandwidth, network delay, network packet loss, and node fanout.

7. The method of claim 4, wherein the one or more application constraints comprises a collaborative usage of an application described by the one or more application constraints.

8. The method of claim 4, wherein the forming the list is a result of performing clustering of the plurality of network nodes, the clustering being based on the single feature vector for each of the plurality of network nodes.

9. The method of claim 8, wherein the clustering is performed using a fusion method in which one or more of said plurality of network nodes are clustered in each attribute space on subspace classifiers.

10. The method of claim 8, wherein the clustering is performed using a nested method in which one or more of said plurality of network nodes are initially clustered based on a sub-set of attributes and then re-clustered by iteratively considering additional attributes.

11. The method of claim 8, wherein the clustering is based on one or more bandwidth constraints.

12. The method of claim 8, wherein the clustering is based on a weighted distance function modeled from normalized attribute subspace metrics.

13. The method of claim 4, wherein the communication interest space map indicates at least one of: a user request for a content update or a user subscription to a specific data item or to a set of proximal data sources.

14. The method of claim 4, wherein the communication interest space map models a communication interest as a vector.

15. The method of claim 4, wherein the communication interest space map models a communication interest as a cell.

16. The method of claim 4, wherein the communication interest space map models a communication interest as a plurality of cells representing a communication interest of a single one of the plurality of network nodes.

17. The method of claim 4, wherein each point in each of the plurality of network attribute maps represents a set of virtual coordinates for one of the plurality of network nodes in a network overlay.

18. The method of claim 4, wherein the forming the plurality of network attribute maps comprises:
 forming a plurality of delay maps from one or more measured network delays;
 forming a path loss map based on one or more network path losses;
 forming a bandwidth map based on one or more bandwidths of the plurality of network nodes; and
 forming a forwarding capacity map based on one or more forwarding capacities at the plurality of network nodes.

* * * * *